United States Patent
Beale et al.

[19]

[11] Patent Number: 5,946,293
[45] Date of Patent: Aug. 31, 1999

[54] MEMORY EFFICIENT CHANNEL DECODING CIRCUITRY

[75] Inventors: Terrance Ralph Beale; Russell Wilbur Pogue, Jr., both of Greentown, Ind.

[73] Assignee: Delco Electronics Corporation, Kokomo, Ind.

[21] Appl. No.: 08/824,028

[22] Filed: Mar. 24, 1997

[51] Int. Cl.[6] ............................... H04B 1/38; H04L 5/16
[52] U.S. Cl. ................... 370/210; 370/203; 375/219; 375/260; 375/232; 364/726.02; 364/726.03
[58] Field of Search ..................... 370/204, 205, 370/206, 208, 210, 244, 484; 375/245, 347, 362, 219, 232, 260, 302; 364/726.02, 726.03, 726.04

[56] References Cited

U.S. PATENT DOCUMENTS

| | | | |
|---|---|---|---|
| 4,792,943 | 12/1988 | Gockler | 370/210 |
| 5,278,844 | 1/1994 | Murphy et al. | 371/37.1 |
| 5,315,583 | 5/1994 | Murphy et al. | 370/18 |
| 5,390,198 | 2/1995 | Higgins | 371/43 |
| 5,408,502 | 4/1995 | How | 375/340 |
| 5,412,694 | 5/1995 | Sato et al. | 375/330 |
| 5,416,787 | 5/1995 | Kodama et al. | 371/43 |
| 5,535,240 | 7/1996 | Carney et al. | 370/210 |
| 5,561,667 | 10/1996 | Gerlach | 370/210 |
| 5,717,620 | 2/1998 | Williams | 364/726.02 |

*Primary Examiner*—Chi H. Pham
*Assistant Examiner*—Frank Duong
*Attorney, Agent, or Firm*—JImmy L. Funke

[57] ABSTRACT

A memory efficient channel decoder circuit is provided for channel decoding differentially modulated data samples comprising multiple adjacent carriers each including two data samples associated therewith. The decoder circuit includes a pair of working read/write memory circuits partitioned into even and odd memory blocks, a separate read/write memory circuit connected thereto, and a complexmultiplier circuit having a first input connected to the working memory circuits, and a second input coupled to the separate read/write memory and a read only memory containing predefined calculation values. An in-place decimation-in-time FFT algorithm is used to differentially demodulate and frequency descramble (de-interleave) the data samples of each data symbol, as well as providing for automatic frequency control correction of the data samples.

12 Claims, 5 Drawing Sheets

DECODE TIMING OF DATA SYMBOLS $80^k$ (DATA SYMBOL k)

| ... | N-1 | 0 | 1 | 2 | ... | N-1 |

Fig. 4A

118, 126 (RAM A)

| ... | INPUT SYMBOL N-1 DATA / OUTPUT SYMBOL N-3 DATA | CALCULATE SYMBOL N-1 DATA | INPUT SYMBOL 1 DATA / OUTPUT SYMBOL N-1 DATA | CALCULATE SYMBOL 1 DATA | ... | INPUT SYMBOL N-1 DATA / OUTPUT SYMBOL N-3 DATA |

Fig. 4B

122, 130 (RAM B)

| ... | CALCULATE SYMBOL N-2 DATA | INPUT SYMBOL 0 DATA / OUTPUT SYMBOL N-2 DATA | CALCULATE SYMBOL 0 DATA | INPUT SYMBOL 2 DATA / OUTPUT SYMBOL 0 DATA | ... | CALCULATE SYMBOL N-2 DATA |

Fig. 4C

MEMORY EFFICIENT CHANNEL DECODING CIRCUITRY

CROSS REFERENCE TO RELATED U.S. PATENT APPLICATIONS

The present invention relates to U.S. Ser. No. 08/823,917 which is related to a digital audio broadcasting (DAB) system and being filed concurrently with this invention.

FIELD OF THE INVENTION

The present invention relates generally to techniques for decoding and descrambling encoded data, and more specifically to such techniques for decoding and descrambling data including multiple carriers that are phase modulated over time.

BACKGROUND OF THE INVENTION

Digital techniques for the transmission and reception of sound information, sometimes referred to a digital audio broadcasting (DAB), have progressed over the past few years and are anticipated, on a worldwide basis, to replace the present frequency modulation (FM) method of transmitting audio and other information. Digital audio broadcasting (DAB) is not only anticipated to replace FM modulation, but the fidelity of audio signals transmitted and received by DAB systems will be greatly enhanced, making DAB's acceptance welcomed worldwide.

One such DAB technique, the Eureka-147 digital audio broadcasting system, has been accepted around the world as an excellent technical solution for digital sound broadcasting to the mobile environment. The Eureka-147 DAB standard ETS300401 specifies a digital transmission technique for satellite, terrestrial, and cable distribution of sound and data in accordance with the Eureka-147 format.

The Eureka-147 standard ETS300401 specifies a Coded-Orthogonal Frequency Division Multiplex (COFDM) modulation technique, wherein the digital information is transmitted in the complex frequency domain using $\pi/4$-shifted D-QPSK on each of multiple carriers with 2 bits per carrier. A transmitter of such a DAB signal is required by ETS300401 to use an Inverse Fast Fourier Transform (IFFT) to convert the signal from frequency to time prior to transmission thereof.

Referring now to FIGS. 2A–2D, the format of broadcast information, in accordance with the Eureka-147 ETS300401 standard, is shown. The digital information depicted in FIG. 2A is defined by frames of information, such as frame 68. Frame 68 defines a structure having a juxtaposition arrangement that includes a synchronization channel 70 which occurs first in time in frame 68, followed by a Fast Information Channel 72 (FIC), which is followed by sets of data symbols which are arranged as successive time multiplexed subchannels, sub-channel 1, sub-channel 2, sub-channel 3 . . . sub-channel N, shown respectively by blocks 80, 82, 84 . . . 86.

The synchronization channel 70, shown in FIG. 2B, comprises symbols designated null symbol 76 and time frequency phase reference symbol (TFPR) 78. FIC 72 includes a number of data symbols illustrated in FIG. 2B as data symbols $72_1$, $72_2$, . . . $72_j$. In accordance with the ETS300401 standard, the FIC 72 may include either three or eight such data symbols. The synchronization channel 70 is added at the beginning of each frame 68 to permit the receiver to synchronize, both in time and carrier frequency, with the stream of data symbols.

As seen in FIG. 2C, each of the sub-channels of data, such as sub-channel 1 (80), is further defined as containing multiple adjacent data symbols, data symbol 1, data symbol 2, data symbol 3, . . . data symbol p, respectively shown in blocks $80^1$, $80^2$, $80^3$, and $80^p$. With reference to FIG. 2D, each data symbol within a particular sub-channel, such as the kth data symbol of sub-channel 1 ($80^k$), is further defined as containing multiple carriers, carrier 1, carrier 2, carrier 3, . . . carrier n, respectively shown in blocks $80^k_1$, $80^k_2$, and $80^k_n$, wherein the n carriers are spread over a frequency bandwidth of interest. Each of the carriers are phase modulated between adjacent data symbols so that each carrier is phase modulated over time. Thus, each of the n carriers are transmitted simultaneously as a data symbol, and each of the p data symbols are transmitted at successive discrete time intervals.

Under standard ETS300401, the Eureka-147 system has the capability of operating in any of four operational modes, each including a different number of active carriers as set forth in Table 1 below. Since the transmitted information is encoded with two bits per carrier, the number of data points placed on each data symbol is equal to the number of carriers times two, thus defining the lengths of data vectors used to spread information across the frequency domain for each of the operational modes.

TABLE 1

Eureka-147 Operational modes

|  | Mode 1 | Mode 2 | Mode 3 | Mode 4 |
| --- | --- | --- | --- | --- |
| Number of Active Carriers | 1536 | 384 | 192 | 768 |
| Number of Data Vector Points | 3072 | 768 | 384 | 1536 |

The $\pi/4$-Differential QPSK modulation technique conveys the information of interest in the rotation of each carrier's phase with respect to the previous symbol's corresponding carrier phase. The phase rotation applied to each carrier is determined by the next two bits to be placed onto that carrier. The data vectors applied to the data symbols 66 are further pre-scrambled before being applied to the carriers, wherein this process of pre-scrambling is known in the art as frequency interleaving. Finally, the ETS300401 standard allows for transmission of data at different rates so that the sub-channels 80–86 are time-multiplexed and are previously pre-scrambled in time, wherein this process of pre-scrambling is known in the art as time interleaving.

A DAB receiver must be capable of receiving the transmitted signals described hereinabove, synchronize with such signals in both time and carrier frequency, and decode the signals for replication of the original information. Decoding of the information in a Eureka-147 based DAB receiver requires the capability of performing a complex Fast Fourier Transform (FFT) to reverse the effect of the IFFT applied by the Eureka-147 DAB transmitter. Due to the four operational modes of the Eureka-147 system as set forth in Table 1 above, a Eureka-147 based DAB receiver must correspondingly be capable of performing various length FFTs as set forth in Table 2 below. It should be understood that, under ETS300401, Table 1 sets forth only the number of active carriers per mode, and that such active carriers make up only ¾ of the total number of carriers for each mode. Table 2 thus sets forth the FFT length requirements for decoding the total number of carriers, N, for each mode of operation of the Eureka-147 system. It can thus be seen from Table 2 that a Eureka-147 based DAB receiver must have the capability to perform complex Fast Fourier Transforms of lengths 2048, 1024, 512 and 256 for each of modes 1, 4, 2 and 3 respectively.

TABLE 2

| Complex N | Potential Data Vector Points | Active Carrier Multiplier | Number of Data Vector Points | Operations 1 Mode |
|---|---|---|---|---|
| 2048 | 4096 | 3/4 | 3072 | 1 |
| 1024 | 2048 | 3/4 | 1536 | 4 |
| 512 | 1028 | 3/4 | 768 | 2 |
| 256 | 512 | 3/4 | 384 | 3 |

Eureka-147 based DAB information is time and frequency interleaved prior to broadcast thereof in accordance with a complex IFFT process. In channel decoding and frequency de-interleaving (descrambling) such signals, known Eureka-147 based receiver systems utilize an arrangement of N-capacity inputs and output data storage buffers operable to store the N-carrier information prior to and following the FFT process. Within the FFT process itself, such known prior art systems further require two more N-capacity memory units for carrying out the FFT process and a fifth N-capacity memory unit for holding previous symbol values for the channel decoding process. Known prior art system thus require a total of 5N storage locations for decoding N-carrier Eureka-147 based DAB information.

Such prior art Eureka-147 based DAB receiving systems are expensive in terms of memory usage required for management thereof. What is therefore needed is an efficient technique for channel decoding and de-interleaving (descrambling) broadcast Eureka-147 based DAB information which minimizes memory required therefore.

SUMMARY OF THE INVENTION

The channel decoding circuitry of the present invention addresses the needs and concerns set forth in the BACKGROUND section. In accordance with one aspect of the present invention, channel decoding circuitry comprises a first memory circuit having a first input for receiving and storing therein channel encoded digital data, a second input for receiving channel decoded digital data, and an output for producing the channel decoded digital data. The channel encoded digital data is defined by a number of data symbols each including multiple adjacent data carriers phase modulated over time. A second memory circuit holds channel encoded digital data of a previous data symbol therein and has an input coupled to the first memory circuit output and an output. A third memory circuit provides predefined calculation values at an output thereof. A multiplier circuit has a first input coupled to the first memory circuit output, a second input coupled to the second memory circuit output and to the third memory circuit output, and an output coupled to the second input of the first memory circuit. The multiplier circuit produces channel decoded digital data by complex multiplying corresponding data carriers provided by the first and second memory circuits along with the predefined calculation values provided by the third memory circuit. The first memory circuit simultaneously stores channel decoded data of a present data symbol provided by the multiplier circuit, produces channel decoded digital data of a previous data symbol at the first memory circuit output and replaces the channel decoded digital data of the previous data symbol with channel encoded digital data of a next data symbol.

In accordance with another aspect of the present invention, the multiplier circuit further corrects for frequency offsets between data carrier frequencies of the encoded digital data and corresponding actual data carrier frequencies thereof by complex multiplying data carriers provided by the first memory circuit with the predefined calculation values.

One object of the present invention is to provide a memory efficient channel decoder that significantly reduces memory requirements over conventional channel decoders.

Another object of the present invention is to provide such a channel decoder that further provides for automatic frequency control and frequency de-interleaving.

Yet another object of the present invention is to provide such a memory efficient channel decoder that provides for automatic frequency control, channel decoding and frequency descrambling utilizing only a single complex multiplier circuit.

These and other objects of the present invention will become more apparent from the following description of the preferred embodiment.

BRIEF DESCRIPTION OF THE DRAWINGS

FIG. 4 is composed of FIGS. 4A–4C and illustrates a preferred technique of utilizing multiple memory banks for accomplishing digital data decoding in accordance with the present invention.

DESCRIPTION OF THE PREFERRED EMBODIMENT

Figure 1:
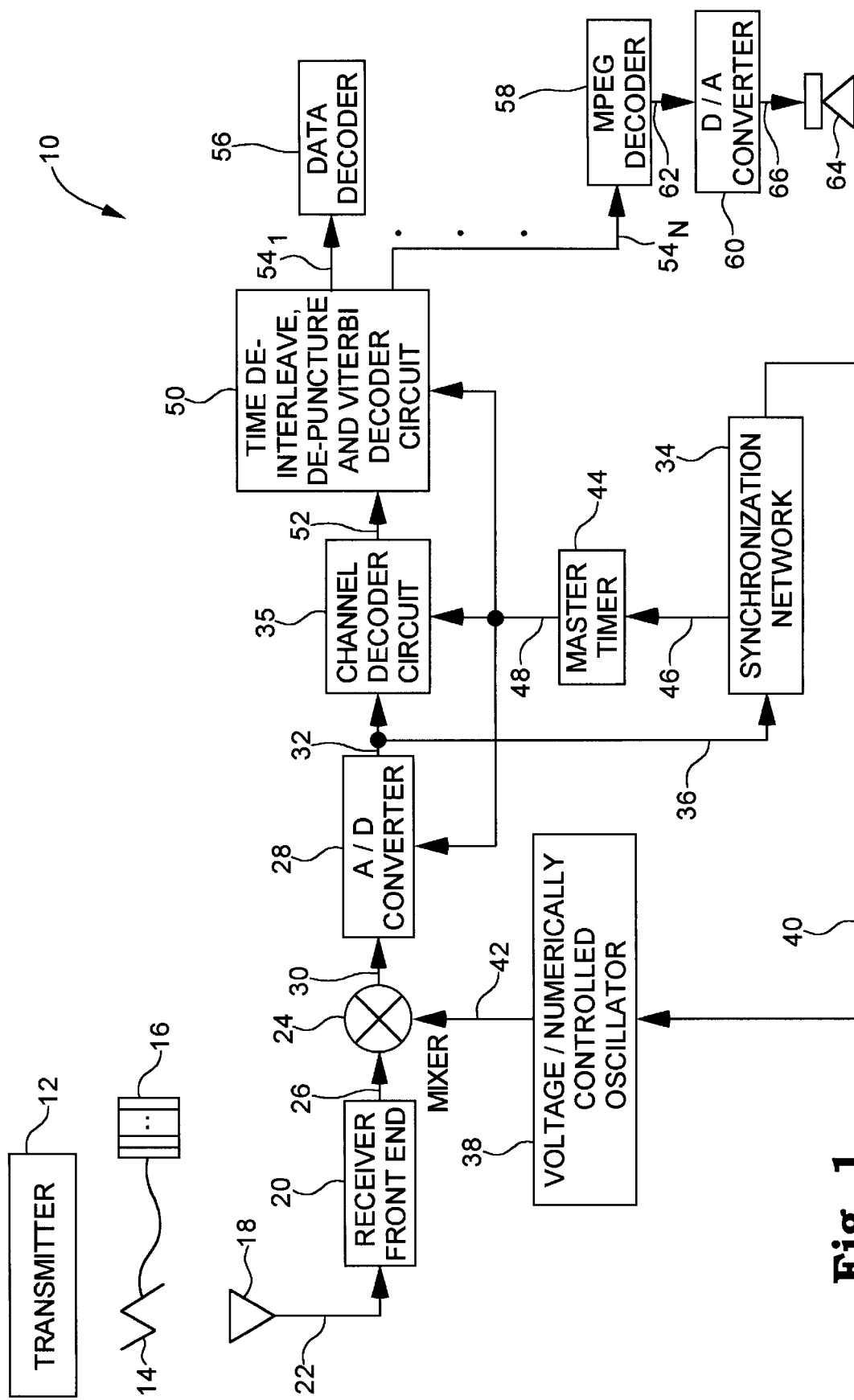
FIG. 1 is a block diagram of one embodiment of a broadcast data receiver particularly suited for reception of COFDM modulated data, incorporating a channel decoder in accordance with the present invention.
Figure 2A:
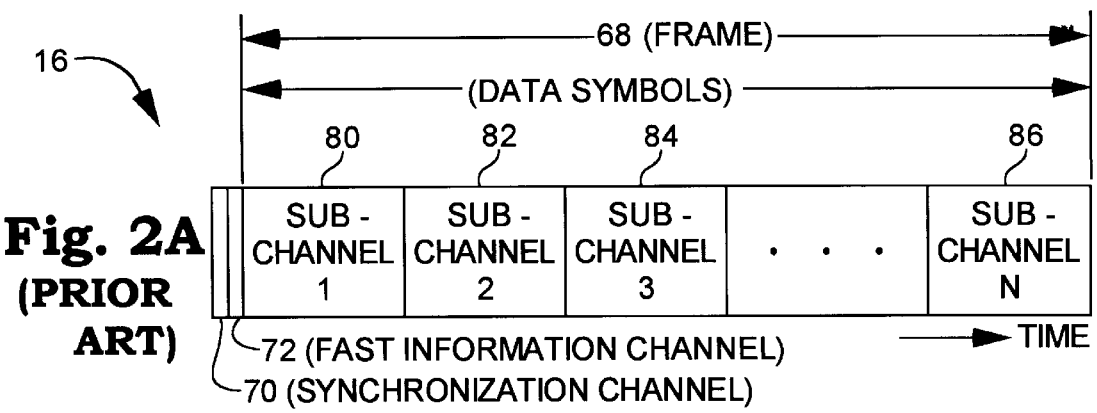
FIG. 2 is composed of FIGS. 2A, 2B, 2C and 2D and illustrates a known frame structure of the digital information transmitted by the transmitter of FIG. 1 and received by the receiver of FIG. 1.
Figure 2B:
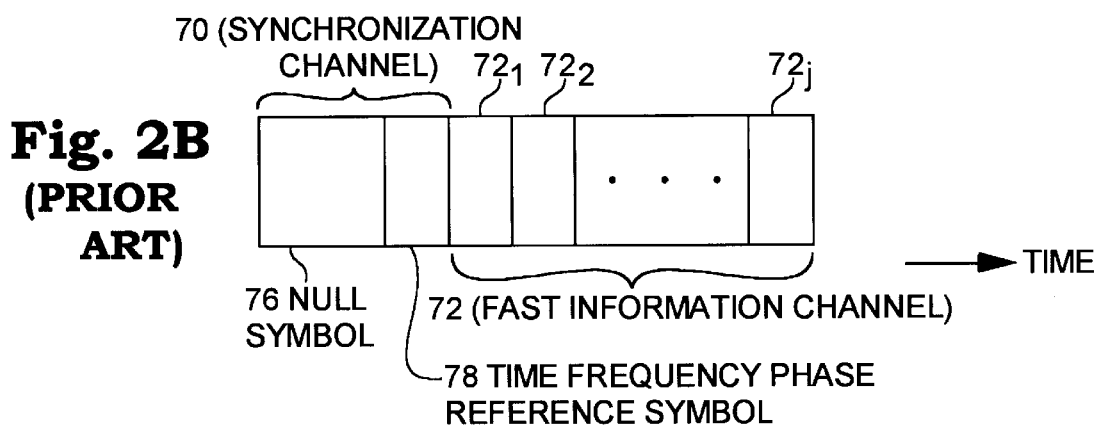
Figure 2C:
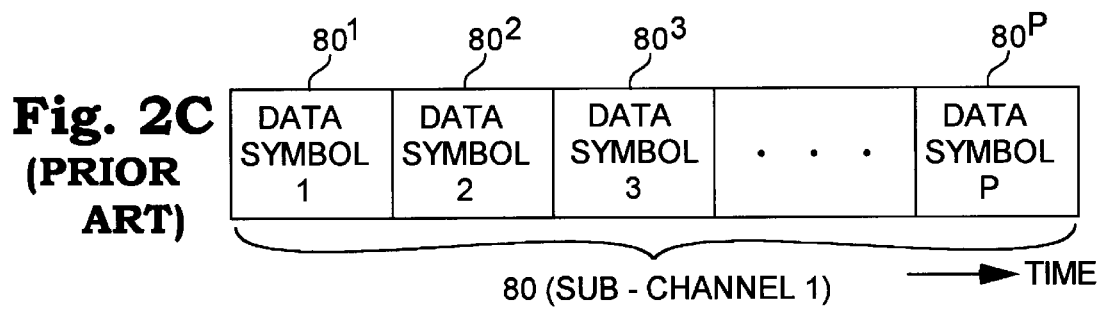
Figure 2D:
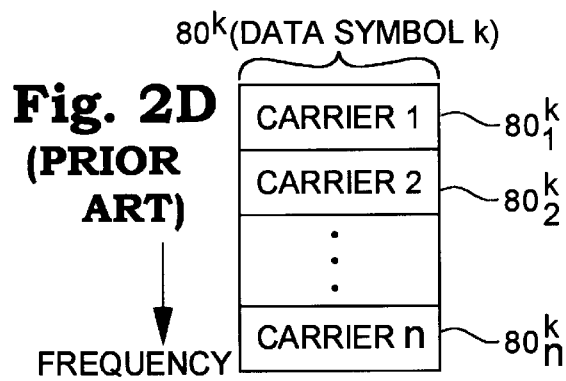

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The Eureka-147 system utilizes multiple frequency domain carriers as vehicles for digital information, rather than a single-phase carrier having a high data rate as is known in the prior art. The use of the multiple carriers to transmit digital information in the form of digital pulses increases data symbol duration as to avoid intersymbol interference associated with delay spread of an RF channel. The wide bandwidth reduces the effects of narrow band multipath interference.

As discussed in the BACKGROUND section, the digital information carried by each of the multiple carriers is transmitted in the complex frequency domain using a p/4-differential quad-phase shift key (p/4-DQPSK) modulation scheme known as Coded-Orthogonal Frequency Division Multiplex, or COFDM, modulation. Each of the multiple carriers of the Eureka-147 system yields two bits of digital information via p/4 DQPSK modulation, and the multiple carriers are arranged in adjacent arrays using an inverse fast Fourier transform (IFFT) algorithm, which assigns complex phases to each frequency domain carrier. The data carried by the carriers are differentially encoded between individual carriers on successive symbols so that channel decoding thereof requires a differential demodulation process to be carried out by the digital information receiver. As is known in the art, such differential decoding techniques do not require synchronous demodulation, and precisely accurate bit timing with the incoming digital information is therefore not required because the differential decoding techniques used by the present invention eliminates errors associated with bit offset timing. The timing of the samples taken by the receiving elements of the Eureka-147 system thus need not be at the peak location of the "open eye" as is common in digital communication systems, but rather timing need only accurately reflect the beginning of a transmitted symbol. The bit timing of the present invention need only be approximately accurate to obtain a majority of the transmitted data, sometimes referred to as symbol energy.

Referring now to FIG. 1, one embodiment of a broadcast data receiver 10, particularly suited for reception of COFDM modulated data, is shown. Receiver 10 includes a known transmitter 12, operable to transmit a digital data stream 14, such as COFDM modulated data 16, which is received by antenna 18. Antenna 18, in turn, routes the received information to a known receiver front end 20 via signal path 22. The receiver front end 20 may have amplifying means to amplify the received signals as is known in the art, and routes such received/amplified signals to a known mixer 24 by way of signal path 26. The mixer 24, in response to the information signal provided thereto via signal path 26 and a feedback signal provided thereto by a known voltage/numerically controlled oscillator 38 via signal path 42, combines these input signals and develops an output signal whose frequency is roughly equal to the difference between the frequencies of its input signals, and routes such an output signal to a known A/D converter 28 by way of signal path 30. Mixer 24 thus provides a frequency-adjusted analog signal that is routed to the A/D converter 28. The digital quantities generated by the A/D converter 28 are routed, by way of signal path 32, to the channel decoder circuit 35 of the present invention, and to a known synchronization network 34 via signal path 36. Channel decoder circuit 35, in turn, provides a channel decoded signal to time de-interleave, de-puncture and viterbi decoder circuit 50 via signal path 52. The channel decoded signal provided by channel decoder circuit 35 consists of multiplexed input time samples, representing in-phase and quadrature time components, and output soft-decision metrics representing the decoded frequency domain samples in time correct order to enter a time de-interleave, de-puncture and viterbi decoding process within time de-interleave, de-puncture and viterbi decoder circuit 50. A preferred embodiment of such a circuit 50 is described in related Attorney Docket No. H-197792, and entitled MEMORY EFFICIENT TIME DE-INTERLEAVE, DE-PUNCTURE AND VITERBI DECODER CIRCUITRY, which is assigned to the assignee of the present invention, and which patent application is herein incorporated by reference.

Synchronization network 34 provides a signal synchronization signal to voltage/numerically controlled oscillator 38 via signal path 40, and further provides a timing signal to a known master timer 44 via signal path 46. The master timer 44, sometimes referred to as a master clock, by means of its output signal on signal path 48 controls the sample timing by which all of the interconnected elements, such as A/D converter 28, channel decoder circuit 35 and time de-interleave, de-puncture and viterbi decoder circuit 50, sample their associated signals. In operation, the feedback loop established between A/D converter 28 and mixer 24, by way of synchronization network 34 and voltage/numerically controlled oscillator 38, synchronizes receiver 10 with the received signal 14 both in time and in frequency. Master timer 44 is responsive to the timing signal provided thereto by synchronization network 34 to produce the master timing signal on signal path 48. The A/D converter 28, channel decoder circuit 35 and time de-interleave, de-puncture and viterbi decoder circuit 50 are, in turn, responsive to the master timing signal on signal path 48 to process the received signal 14 in a time-synchronized manner.

The synchronization network 34 and voltage/numerically controlled oscillator 38 are responsive to the signal provided thereto via signal path 36 to acquire a "rough" frequency synchronization with the received signal 14. Such an arrangement permits the receiver 10 to achieve a frequency lock of within a few carriers of the transmitted signal's frequency. The ETS300401 standard, however, requires a frequency lock of better than the frequency spacing between each of the multiple carriers, which translates to a frequency lock requirement of better than 0.02* carrier spacing. As will be discussed in greater detail hereinafter, the channel decoder circuit 35 of the present invention is operable to improve the frequency synchronization, in accordance with digital automatic frequency control (AFC) techniques, to achieve a frequency lock with the transmitted signal of better than 0.02* carrier spacing as required for data reliability.

The time de-interleave, de-puncture and viterbi decoder circuit 50 provides a number N of digital signals on signal paths $54_1$–$54_N$, wherein N corresponds to the number of decoded channels of information. The decoded information available on any given signal path $54_K$ may be either music information or other digital data. If the decoded information is digital data other than music, the signal path is routed to a data decoder 56, such as illustrated by signal path $54_1$ in FIG. 1. If, however, the decoded information is music information, such as that present on signal path $54_N$, the signal path is routed to an MPEG decoder 58 of known construction. The MPEG decoder 58 is connected to a D/A converter 60 via signal path 62, and the D/A converter 60, in turn, provides an analog output signal to speaker 64 via signal path 66 for audio reproduction of the transmitted signal.

Figure 3:
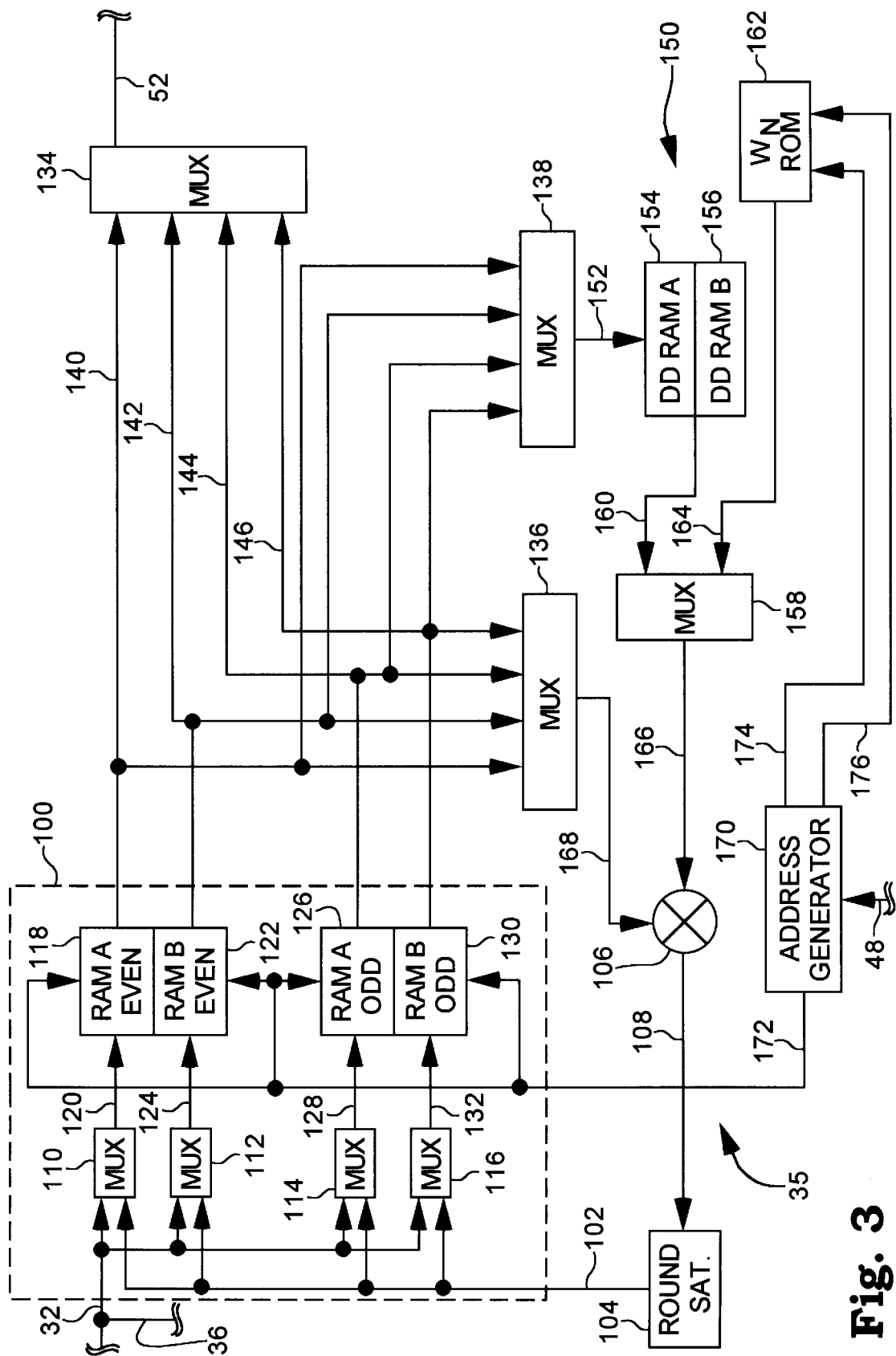
FIG. 3 is a block diagram illustrating one embodiment of a channel decoding circuit particularly suited for decoding multiple carrier phase modulated digital data, in accordance with the present invention.

Referring now to FIG. 3, a preferred embodiment of a channel decoder circuit 35, in accordance with the present invention, is shown. Central to channel decoder circuit 35 is a memory circuit 100 having a first input connected to signal path 32 and a second input connected to a rounding saturation circuit 104 via signal path 102. Memory circuit 100 produces an output signal on a number of output signal paths 140–146, which signal paths are multiplexed to single output lines 52, 168 and 152 via known 4:1 multiplexing circuits (MUX) 134, 136 and 138 respectively.

In one embodiment, memory circuit 100 includes four 2:1 multiplexing circuits (MUX) 110, 112, 114 and 116 of known construction, wherein each multiplexing circuit 110–116 has a first input connected to signal path 32 and a second input connected to signal path 102. Memory circuit 100 is partitioned into a pair of memory subcircuits RAM A and RAM B, each of which are further partitioned into RAM A EVEN 118 and RAM A ODD 126 circuits and RAM B EVEN 122 and RAM B ODD 130 circuits respectively. Preferably, memory circuits 118, 122, 126 and 130 are suitably partitioned from a single memory block, although the present invention contemplates providing such memory circuits from separate, or stand-alone, memory circuits. In either case, memory circuits 118, 122, 126 and 130 are temporary read/write storage circuits such as Random Access Memory (RAM) circuits of known construction.

RAM A EVEN 118 has an input connected to MUX 110 via signal path 120, and an output connected to first inputs of MUXs 134, 136 and 138 via signal path 140. RAM B EVEN 122 has an input connected to MUX 112 via signal path 124, and an output connected to second inputs of MUXs 134, 136 and 138 via signal path 142. RAM A ODD 126 has an input connected to MUX 114 via signal path 128, and an output connected to third inputs of MUXs 134, 136 and 138 via signal path 144. RAM B ODD 130 has an input connected to MUX 116 via signal path 132, and an output connected to fourth inputs of MUXs 134, 136 and 138 via signal path 146.

MUX 138 has an output connected to an input of a differential demodulation memory circuit 150 via signal path 152. In one embodiment, differential demodulation memory circuit 150 is partitioned into a DDRAM A memory circuit 154 and a DDRAM B memory 156. As with memory circuits 118, 122, 126 and 130, memory circuits DDRAM A 154 and DDRAM B 156 are preferably partitioned from a single memory block, although the present invention contemplates providing such memory circuits from separate, or stand-alone, memory circuits. In either case, memory circuits 154 and 156 are temporary read/write storage circuits such as Random Access Memory (RAM) circuits of known construction. Memory circuit 150 has an output connected to a first input of a known 2:1 multiplexing circuit (MUX) 158 via signal path 160.

Channel decoder circuit 35 further includes a memory circuit 162 connected to MUX 158 via signal path 164. Memory circuit 162 holds predefined calculation values therein, as will be discussed more fully hereinafter, and may therefore be a read-only-memory (ROM) circuit of known construction. Memory circuit 162 includes two address inputs connected to an address generator circuit 170 via signal paths 174 and 176. Address generator 170 is further connected to address inputs of RAM A EVEN 118, RAM B EVEN 122, RAM A ODD 126 and RAM B ODD 130 via signal path 172.

MUX circuit 158 includes a MUX output 166 connected to a first input of a complex multiplier circuit 106 which may be of known construction. A second input of complex multiplier circuit 106 is connected to a MUX output of MUX circuit 136. An output of complex multiplier circuit 106 is connected to an input of rounding saturation circuit 104 via signal path 108.

The channel decoder circuit 35 of the present invention is operable to channel decode the stream of digital data 14 by processing the digital data in accordance with a complex Fast Fourier Transform (FFT) of length 2048, 1024, 512 or 256, depending upon the operational mode of the Eureka-147 system as set forth in Table 2 above. For lengths 1024 and 256, a radix-4 in-place calculation is preferably used, and for lengths 2048 and 512, a split radix4–radix2 in-place calculation is preferably used. The channel decoder circuit 35 is also operable to perform frequency interleave descrambling as well as automatic frequency control (AFC) adjustments so that the resulting channel decoded digital signal provided by channel decoder circuit 35 on signal path 52 is in time correct order and is suitably adjusted in frequency to correct for any resulting offset between the transmitter 12 and receiver local oscillator 38. For all operational modes, the FFT is preferably calculated using a known decimation-in-time (DIT) algorithm which allows for an efficient use of hardware to accomplish both the decoding and descrambling processes, as well as the AFC correction process, as will be described more fully hereinafter.

With reference to FIGS. 1–4C, memory efficient operation of the channel decoder circuit 35 will now be described. With each new data symbol (see FIGS. 2A–2D) entering the receiver 10, the synchronization network 34 sends a timing signal to master timer 44. Master timer 44, in turn, produces a data enable signal on signal path 48 that resets the address generator 170. Thus, for every new data symbol entering circuit 35, the address generator 170 resets an address count on signal path 172 to an initial value, such as zero, and thereafter proceeds to count at a predefined clock rate.

Memory circuit 100 is partitioned into even and odd ram banks such that are two sets of even and odd banks, RAM A EVEN 118, RAM A ODD 1126 and RAM B EVEN 122, RAM B ODD 130. The manner in which the symbol's digital data (two bits per carrier) is input into the memory circuit 100 is determined in accordance with the value of the signal present on signal path 172. In one preferred embodiment, the digital data is directed into the respective even and odd ram banks by counting the number of ones in the address. If the number of ones in the address is even, the first data value of the present carrier is stored in RAM A EVEN 118. If, on the other hand, the number of ones in the address is odd, the first data value of the present carrier is stored in RAM A ODD 126. It should be understood that for an N-carrier system (see Table 2), each of the RAM A and RAM B memory banks must be of size N/2 to capture all of the encoded data.

As will be described in greater detail hereinafter, channel decoder circuit 35 is operable to compute an in-place Fast Fourier Transform, in accordance with a known decimation-in-time radix-4 or split radix4–radix2 algorithm, in order to simultaneously accomplish AFC correction and differentially demodulate as well as descramble (frequency de-interleave) the digital data. In so doing, the complex multiplier circuit 106 is operable to systematically complex multiply pairs of digital data from a present data symbol taken from either RAM A EVEN 118 and RAM A ODD 126, or RAM B EVEN 122 and RAM B ODD 130, with either corresponding digital data of the previous symbol stored in DDRAM A 154 and DDRAM B 156 during processing of the previous symbol and/or predefined calculation values taken from memory circuit 162. In accordance with either the radix-4 or split radix4–radix2 algorithms, four such multiplications must be performed per FFT butterfly as is known in the art. The output of the complex multiplier circuit 106 for any such multiplication is provided to rounding saturation circuit 104 in order to round and saturate the complex multiply results as is known in the art, and is thereafter provided back to memory circuit 100 via MUXs 110–116.

In accordance with an important aspect of the present invention, some data symbols are moved through one ram bank (RAM A EVEN/ODD or RAM B EVEN/ODD) while complex multiplications are performed on other data symbols. Since the final output data pairs of the complex multiplication process are in time correct order, the input/output data pairs during the computation process can be exchanged one-for-one in the memory circuit 100. Such a one-for-one exchange procedure eliminates any need for separate input and/or output data buffers which are used in prior art circuits as discussed hereinabove. Referring to FIGS. 4A–4C, an example of the foregoing data flow process through channel decoder circuit 35 is shown.

FIG. 4A illustrates the processing of the encoded digital data by channel decoder circuit 35 on a symbol-by-symbol basis. As illustrated in FIGS. 4B and 4C, as encoded data values for a present data symbol are withdrawn from one ram bank for decoding thereof via the FFT process, the opposite ram bank is simultaneously outputting decoded data values for the previous symbol(onto signal path 52) and inputting encoded data values for the next data symbol via MUXs 110–116). As discussed hereinabove, the data pairs for any given symbol are preferably moved through the ram banks on a one-for-one exchange basis.

Figure 5:
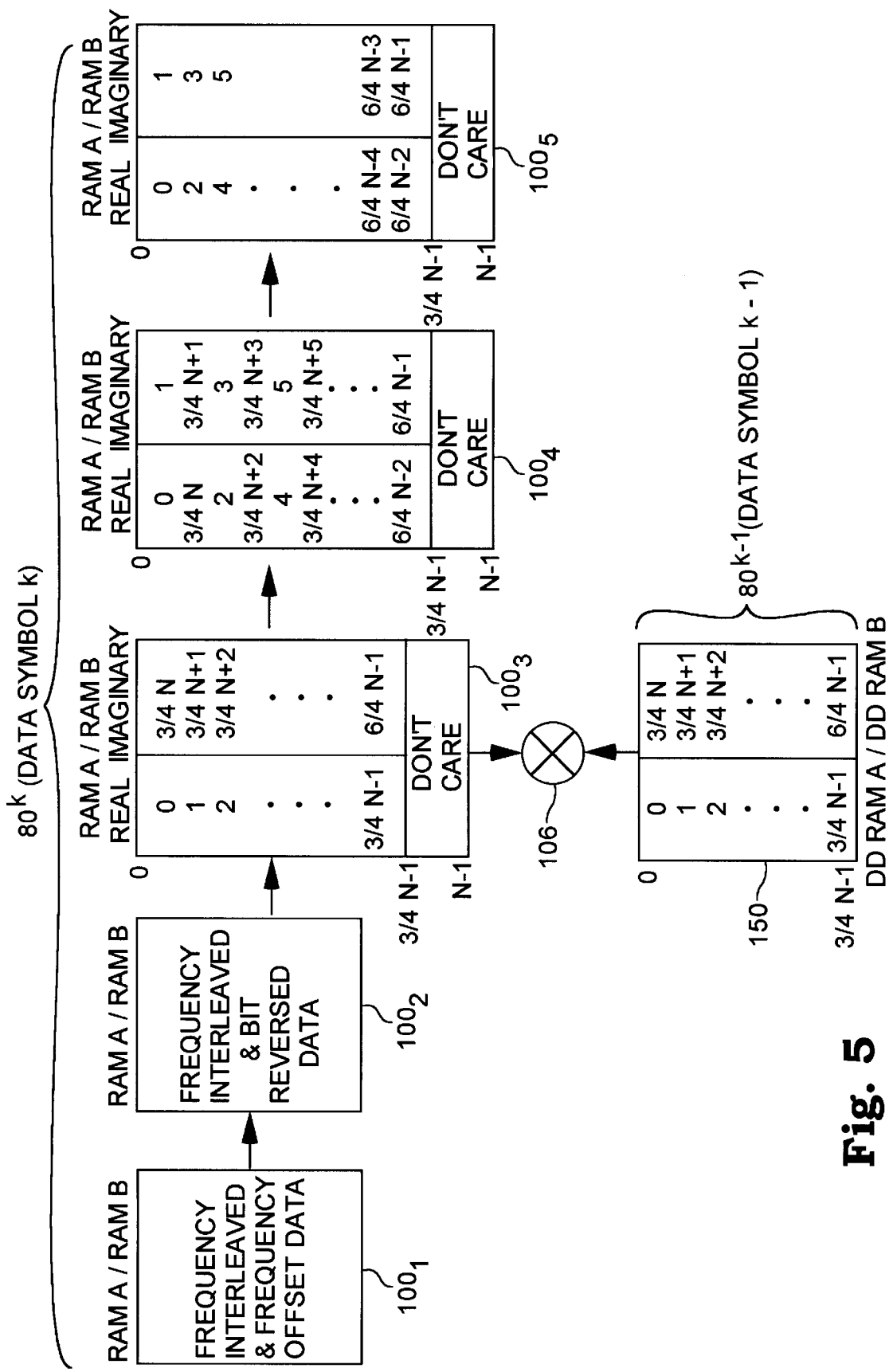
FIG. 5 is a diagrammatic illustration of the contents of the memory circuits of FIG. 3 throughout the channel decoding, frequency descrambling and automatic frequency control processes of the present invention.

Referring now to FIG. 5, the contents of the ram banks of memory circuit 100 during the processing of any given data symbol, such as data symbol $68^k$, during the various stages of the FFT algorithm, are illustrated. Upon detection of a symbol enable signal, circuit 35 loads the encoded symbol; i.e. frequency scrambled (interleaved) and frequency offset data symbol $68^k$, into the ram banks of memory circuit $100_1$ according to techniques described hereinabove. For the first complex multiply performed by complex multiplier 106 in the FFT process, the present invention takes advantage of the fact that the so-called FFT twiddle values forming some of the predefined calculation values stored in memory circuit 162 are all real valued (i.e., w(0)=1+j0). Address generator 170 provides first predefined addressing values to memory circuit 162 via circuit path 174, to which circuit 162 is responsive to supply such twiddle values to MUX 158. MUX 158, in turn, supplies the twiddle values to complex multiplier circuit 106 as is known in the art. Address generator 170 further provides second predefined addressing values to memory circuit 162 during this first stage of FFT computation, to which circuit 162 is responsive to supply accumulated phase rotation values forming some of the predefined calculation values stored therein to MUX 158. Since a decimation-in-time algorithm is used for the FFT, and the twiddle values for the first FFT stage are all real-valued, the AFC correction calculation can be made by the complex multiplier 106 using the digital data symbol values, the twiddle values and accumulated phase rotation values to correct frequency offset of the data symbol samples as is known in the art. The complex rotation of the time samples is accomplished using the same complex multiplier and twiddle rom memory circuit 162 required for the FFT computation, thus minimizing the hardware required to accommodate an AFC function. As required by the ETS300401 standard, frequency offset correction is performed during this first stage of FFT computation to ensure a frequency lock of better than 0.02* carrier spacing.

The second stage of the FFT algorithm accomplishes a first frequency descrambling (frequency de-interleaving) of the data symbol samples as shown by memory circuit $100_2$. This first frequency descrambling in an in-place combined descramble that corrects for the bit-reversed nature of the FFT algorithm and frequency scrambling. As shown by memory circuit $100_2$, the active carrier data points of the data symbol are placed in the upper portions of the even and odd memory banks RAM A and RAM B (118–130) which effectively reduces the amount of memory required to store the previous symbol's data points in the DDRAM A and DDRAM B memory circuit 150 as will be described more fully with respect to memory circuit $100_3$. The second complex multiplication carried out by complex multiplier 106 thus places the symbol's data samples in time corrected order, as shown by the resultant memory circuit $100_3$, beginning with data samples 0–3N/4–1 placed in the real locations, followed by data samples 3N/4–6N/4–1 placed in the imaginary locations, of the RAM A (RAM A EVEN 118 and RAM A ODD 126) or the RAM B (RAM B EVEN 122 and RAM B ODD 130) memory block, depending upon which of the ram banks is involved in the computation. The remaining locations of the EVEN and ODD ram banks are don't care conditions and correspond to the inactive carriers of the N-carrier system.

The third stage of the FFT algorithm accomplishes the differential demodulation process which takes two complex data samples at a time from each of the differential rams, DDRAM A 152 and DDRAM B 154, and complex multiplies these data samples with corresponding data samples from either the RAM A (RAM A EVEN 118 and RAM A ODD 126) or the RAM B (RAM B EVEN 122 and RAM B ODD 130) memory block, depending upon which of the ram banks is involved in the computation as described hereinabove with respect to FIGS. 4A–4C. This process is illustrated in FIG. 5 with respect to the contents of memory circuit $100_3$ and memory circuit 150. In preparation for the final descrambling stage of the FFT algorithm, the data samples resulting from the differential demodulation process are reordered before placing them back into the working ram memory bank (memory circuit 100). As shown in the resultant contents of memory circuit $100_4$, a preferred technique for reordering the demodulated data samples involves swapping the imaginary data points of the EVEN ram bank data samples with the real data points of the ODD ram bank data samples prior to placing the data points back into the working ram memory bank. The third complex multiplication carried out by complex multiplier 106 thus reorders the symbol's demodulated data samples, as shown by the resultant memory circuit $100_4$, such that data samples 0, 3N/4, 2, 3N/4+2, 4, 3N/4+4 and so on are placed in the real locations, followed by data samples 1, 3N/4+1, 3, 3N/4+3, 5, 3N/4+5 and so on being placed in the imaginary locations, of the RAM A (RAM A EVEN 118 and RAM A ODD 126) or the RAM B (RAM B EVEN 122 and RAM B ODD 130) memory block, depending upon which of the ram banks is involved in the computation. The remaining locations of the EVEN and ODD ram banks are don't care conditions and correspond to the inactive carriers of the N-carrier system.

As illustrated by the DDRAM memory circuit 150 connected to the complex multiplier circuit 106 below the memory circuit $100_3$ in FIG. 5, only the data corresponding to the active carriers (see Table 1) need be stored therein. DDRAM A 152 and DDRAM B 154 each therefore need only be of size 3N/8 to thereby hold 3N/4 values of the active carriers (see Tables 1 and 2). This results in a significant savings in memory over known prior art systems. It is to be understood that during stage 3 of the FFT process, the DDRAM A and DDRAM B samples are replaced one-for-one by corresponding data samples from the EVEN/ODD working rams 118–130, depending upon which ram bank is involved in the complex multiplication for a given symbol as discussed hereinabove. By replacing the carrier data of the previous data symbol stored in memory circuit 150 with the carrier data of the present data symbol stored in the working rams, the next data symbol is automatically prepared for the data demodulation process.

The final stage of the FFT algorithm accomplishes a second descrambling of the demodulated data symbol samples as shown by memory circuit $100_5$. This second descrambling is an in-place combined descramble that prepares the demodulated data samples for input/output data exchange without a requirement of further buffering prior to a time de-interleaving process. As shown by memory circuit $100_5$, the active demodulated carrier data points of the data symbol are again placed in the upper portions of the even and odd memory banks RAM A and RAM B (118–130). The second descramble thus places the symbol's data samples in time corrected order with respect to both of the EVEN and ODD memory banks, as shown by the resultant memory circuit $100_5$, beginning with the even data samples 0, 2, 4, 6, . . . 6N/4–2 placed in the real locations, followed by the odd data samples 1, 3, 5, 7, . . . 6N/4–1 being placed in the imaginary locations, of the RAM A (RAM A EVEN 118 and RAM A ODD 126) or the RAM B (RAM B EVEN 122 and RAM B ODD 130) memory block, depending upon which of the ram banks is involved in the computation. The remaining locations of the EVEN and ODD ram banks are don't care conditions and correspond to the inactive carriers of the N-carrier system. The contents $100_5$ of the working ram (memory circuit 100) thus represents demodulated data samples for a given data symbol that are appropriately ordered for subsequent processing by a time de-interleaving circuit, which contents are provided on signal path 52 (FIGS. 1 and 3).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, while the channel decoder circuit 35 of the present invention may be constructed of known discrete electrical components, circuit 35 is preferably formed of a single custom integrated circuit according to known semiconductor fabrication processes.

The embodiments of the invention in which an exclusive property or privilege is claimed are defined as follows:

1. Channel decoding circuitry comprising:
    a first memory circuit having a first input for receiving and storing therein channel encoded digital data, a second input for receiving channel decoded digital data, and an output for producing the channel decoded digital data, the channel encoded digital data defined by a number of data symbols each including multiple adjacent data carriers phase modulated over time;
    a second memory circuit having an input coupled to said first memory circuit output and an output, and holding channel encoded digital data of a previous data symbol therein;
    a third memory circuit providing predefined calculation values at an output thereof; and
    a multiplier circuit having a first input coupled to said first memory circuit output, a second input coupled to said second memory circuit output and to said third memory circuit output, and an output coupled to said second input of said first memory circuit, said multiplier circuit producing channel decoded digital data by complex multiplying corresponding data carriers provided by said first and second memory circuits along with said predefined calculation values provided by said third memory circuit, said first memory circuit simultaneously storing channel decoded data of a present data symbol provided by said multiplier circuit, producing channel decoded digital data of a previous data symbol at said first memory circuit output and replacing the channel decoded digital data of the previous data symbol with channel encoded digital data of a next data symbol.

2. The circuitry of claim 1 wherein the carriers of the channel encoded digital data are reversed in a time sequence thereof;
    and wherein the carriers of the decoded digital data produced at said output of the multiplier circuit are provided to said second input of said first memory circuit in a corrected time sequence thereof.

3. The circuitry of claim 1 wherein said first memory circuit is partitioned into a first memory subcircuit and a second memory subcircuit, each of said first and second memory subcircuits alternately providing a present encoded digital data symbol to said second memory circuit and said multiplier circuit for decoding of the digital data while the other of said first and second memory subcircuits replaces a previous decoded digital data symbol with a next encoded digital data symbol.

4. The circuitry of claim 3 further including an address counter providing an address count at an output thereof;
    and wherein each of said first and second memory subcircuits include an address input connected to said address counter output, said first and second memory subcircuits respectively storing and providing digital data samples in accordance with said address count.

5. The circuitry of claim 4 wherein each of said first and second memory subcircuits are partitioned into even and odd memory banks;
    and wherein said even memory banks of said first and second memory subcircuits replace a previous decoded digital data symbol with a next encoded digital data symbol and said odd memory banks of said first and second memory subcircuits provide a present encoded digital data symbol to said second memory circuit and said multiplier circuit for decoding of the digital data if said address count is even, while said odd memory banks of said first and second memory subcircuits replace a previous decoded digital data symbol with a next encoded digital data symbol and said even memory banks of said first and second memory subcircuits provide a present encoded digital data symbol to said second memory circuit and said multiplier circuit for decoding of the digital data if said address count is odd.

6. The circuitry of claim 1 wherein the channel encoded digital data received at said first input of said first memory circuit is encoded in accordance with an inverse Fourier transform algorithm;
    and wherein said multiplier circuit produces channel decoded digital data in accordance with a Fourier transform algorithm.

7. The circuitry of claim 4 wherein said Fourier transform algorithm includes one of a decimation-in-time radix-4 in-place Fourier transform calculation and a decimation-in-time split radix4–radix2 Fourier transform calculation.

8. The circuitry of claim 1 wherein the channel decoding circuitry is formed of a single integrated circuit.

9. Channel decoding circuitry comprising:
    a first memory circuit having a first input for receiving and storing therein channel encoded digital data, a second input for receiving channel decoded digital data, and an output for producing the channel decoded digital data, the channel encoded digital data defined by a number of data symbols each including multiple adjacent data carriers transmitted simultaneously over a predetermined frequency range, wherein each of the multiple data carriers are phase modulated over time;

a second memory circuit having an input coupled to said first memory circuit output and an output, and holding channel encoded digital data of a previous data symbol therein;

a third memory circuit providing predefined calculation values at an output thereof; and a multiplier circuit having a first input coupled to said first memory circuit output, a second input coupled to said second memory circuit output and to said third memory circuit output, and an output coupled to said second input of said first memory circuit, said multiplier circuit producing channel decoded digital data by complex multiplying corresponding data carriers provided by said first and second memory circuits along with said predefined calculation values provided by said third memory circuit, said multiplier circuit further correcting for frequency offsets between data carrier frequencies of the encoded digital data and corresponding actual data carrier frequencies thereof by complex multiplying data carriers provided by said first memory circuit with said predefined calculation values.

10. The circuitry of claim 9 wherein said predefined calculation values include Fourier transform twiddle values.

11. The circuitry of claim 10 wherein said predefined calculation values further include accumulated linear phase rotation values for said data carriers.

12. The circuitry of claim 9 wherein the channel decoding circuitry is formed of a single integrated circuit.

* * * * *